US012573006B2

(12) United States Patent
Park et al.

(10) Patent No.: US 12,573,006 B2
(45) Date of Patent: Mar. 10, 2026

(54) DISPLAY APPARATUS FOR OBTAINING OUTPUT IMAGE USING EDGE IMAGE AND CONTROL METHOD THEREOF

(71) Applicant: SAMSUNG ELECTRONICS CO., LTD., Suwon-si (KR)

(72) Inventors: Jaesung Park, Suwon-si (KR); Younghoon Jeong, Suwon-si (KR); Jongho Kim, Suwon-si (KR); Kyuha Choi, Suwon-si (KR); Youngsu Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 18/541,561

(22) Filed: Dec. 15, 2023

(65) Prior Publication Data

US 2024/0144438 A1     May 2, 2024

Related U.S. Application Data

(63) Continuation of application No. PCT/KR2023/017133, filed on Oct. 31, 2023.

(30) Foreign Application Priority Data

Nov. 1, 2022     (KR) ......................... 10-2022-0143782

(51) Int. Cl.
  *G06T 5/50*       (2006.01)
  *G06T 3/40*       (2024.01)
        (Continued)

(52) U.S. Cl.
  CPC .................. *G06T 5/50* (2013.01); *G06T 3/40* (2013.01); *G06T 5/70* (2024.01); *G06T 7/13* (2017.01);
        (Continued)

(58) Field of Classification Search
  CPC ........... G06T 11/00; G06T 2207/10024; G06T 2207/20084; G06T 2207/20221;
        (Continued)

(56) References Cited

U.S. PATENT DOCUMENTS 5,687,251 A  *  11/1997  Erler .................... G06T 7/0012
                                             382/199
8,184,196 B2     5/2012  Forutanpour
        (Continued)

FOREIGN PATENT DOCUMENTS

CN        106408533        10/2019
JP      2008033897 A       2/2008
        (Continued)

OTHER PUBLICATIONS

Search Report and Written Opinion dated Feb. 8, 2024 in International Application No. PCT/KR2023/017133.

*Primary Examiner* — Xiao M Wu
(74) *Attorney, Agent, or Firm* — Nixon & Vanderhye, P.C.

(57) ABSTRACT

A display apparatus is disclosed. The display apparatus includes: a display; a memory storing at least one instruction; and one or more processors connected to the display and the memory to control the display apparatus, wherein the one or more processors are configured to: pre-process an image; obtain an edge image by identifying a contour corresponding to each of a plurality of objects included in the pre-processed image; perform image processing to adjust at least one of a thickness or a color of each of the plurality of contours included in the edge image; obtain an output image by overlaying or blending the edge image subjected to image processing on or with the pre-processed image; and display the output image through the display.

20 Claims, 13 Drawing Sheets

(51) Int. Cl.

| | |
|---|---|
| *G06T 5/70* | (2024.01) |
| *G06T 7/13* | (2017.01) |
| *G06T 7/50* | (2017.01) |
| *G06V 10/46* | (2022.01) |
| *G06V 10/54* | (2022.01) |

(52) U.S. Cl.
CPC ............... *G06T 7/50* (2017.01); *G06V 10/46* (2022.01); *G06V 10/54* (2022.01); *G06T 2207/10024* (2013.01); *G06T 2207/20221* (2013.01)

(58) Field of Classification Search
CPC ... G06T 2207/30196; G06T 3/40; G06T 5/50; G06T 5/70; G06T 7/13; G06T 7/50; G06T 2207/20081; G06V 10/25; G06V 10/46; G06V 10/54; G06V 10/56; G06V 10/82; G06V 20/62; G06V 40/161
See application file for complete search history.

(56) References Cited

U.S. PATENT DOCUMENTS

| | | | |
|---|---|---|---|
| 8,460,182 B2 | 6/2013 | Ouyang et al. | |
| 8,704,653 B2 | 4/2014 | Seder et al. | |
| 8,942,441 B2 * | 1/2015 | Nielsen ..................... | G06T 7/12 382/199 |
| 9,313,479 B2 | 4/2016 | Koyama et al. | |
| 10,051,255 B2 | 8/2018 | Koyama et al. | |
| 10,130,548 B2 | 11/2018 | Lydecker et al. | |
| 10,170,081 B2 | 1/2019 | Kageyama et al. | |
| 10,484,660 B2 | 11/2019 | Koyama et al. | |
| 11,049,349 B2 | 6/2021 | Onischuk | |
| 11,128,909 B2 | 9/2021 | Cho et al. | |
| 11,195,261 B2 | 12/2021 | Nam | |
| 2006/0056673 A1 * | 3/2006 | Dehmeshki ............ | A61B 6/463 382/131 |
| 2012/0243786 A1 | 9/2012 | Koyama et al. | |
| 2016/0227186 A1 | 8/2016 | Koyama et al. | |
| 2017/0140545 A1 * | 5/2017 | Jalali ........................ | G06T 7/13 |
| 2017/0360295 A1 | 12/2017 | Oz | |
| 2018/0174281 A1 | 6/2018 | Smith | |
| 2018/0309973 A1 | 10/2018 | Koyama et al. | |
| 2020/0058113 A1 | 2/2020 | Nam | |
| 2020/0134824 A1 * | 4/2020 | Adiga ...................... | G06T 3/40 |
| 2021/0092472 A1 | 3/2021 | Cho et al. | |
| 2021/0228283 A1 * | 7/2021 | Abhari ..................... | G06T 7/20 |

FOREIGN PATENT DOCUMENTS

| | | | |
|---|---|---|---|
| JP | 2017-033577 | | 2/2017 |
| JP | 6617705 B2 | | 11/2019 |
| KR | 20110053348 A | | 5/2011 |
| KR | 101295582 B1 | | 8/2013 |
| KR | 10-2017-0104463 A | | 9/2017 |
| KR | 10-1885473 B1 | | 8/2018 |
| KR | 10-2020-0070055 A | | 6/2020 |
| KR | 10-2271285 B1 | | 7/2021 |
| KR | 10-2022-0004922 A | | 1/2022 |
| KR | 10-2393299 | | 5/2022 |

* cited by examiner

1. DETECTION OF CONTOUR AFTER DOWN-SAMPLING
2. THICKNESS/COLOR PROCESSING ON DETECTED CONTOUR
3. OVERLAYING OF CONTOUR ON LOW RESOLUTION IMAGE
4. UP-SAMPLING OF IMAGE (W/CONTOUR)
5. IMPROVEMENT OF IMAGE QUALITY THROUGH IMAGE
   PROCESSING AND DEEP LEARNING

100

MULTI-VIEW MODE IS TERMINATED.
SWITCH TO NORMAL VIEWING MODE?

YES) SWITCH TO VIEWING MODE FOR NORMAL PEOPLE
NO) SWITCH TO VIEWING MODE FOR VISUALLY
IMPAIRED PEOPLE

SCREEN FOR VISUALLY IMPAIRED PEOPLE 1          4          3

DISPLAY APPARATUS FOR OBTAINING OUTPUT IMAGE USING EDGE IMAGE AND CONTROL METHOD THEREOF

CROSS-REFERENCE TO RELATED APPLICATIONS

This application is a bypass continuation of International Application No. PCT/KR2023/017133, filed on Oct. 31, 2023, which is based on and claims priority to Korean Patent Application No. 10-2022-0143782, filed on Nov. 1, 2022, in the Korean Intellectual Property Office, the disclosures of which are incorporated by reference herein in their entireties.

BACKGROUND

Field

The disclosure relates to a display apparatus and a control method thereof, and more particularly, to a display apparatus for obtaining an output image using an edge image and a control method thereof.

Description of Related Art

Various types of display apparatuses are being developed and widely used.

Recently, display apparatuses having viewing assistive functions have been developed and widely used. The viewing assistive functions may include a function of generating subtitles to be output together with images in order to improve a viewing environment for a user with a hearing impairment, a function of outputting images after improving the visibility of the images in order to improve a viewing environment for a user with a visual impairment, and the like.

However, the conventional viewing assistive functions for a user with a visual impairment are simply limited to functions of providing a high contrast mode, providing an image after being enlarged, and providing an image after being subjected to color inversion, without considering a feature of an image (e.g., a meaningful portion in the image), a user's characteristic (e.g., an impairment grade).

There has been a continuous need for a method of outputting an image after improving the visibility of the image by performing image processing in consideration of a grade of a user's impairment or a portion that a user is likely to be interested in within an image, rather than performing uniform image processing for a user with a visual impairment.

SUMMARY

According to an example embodiment of the disclosure, a display apparatus includes: a display; a memory storing at least one instruction; and at least one processor connected to the display and the memory to control the display apparatus, wherein the at least one processors are configured to: pre-process an image; obtain an edge image by identifying a contour corresponding to each of a plurality of objects included in the pre-processed image; perform image processing to adjust at least one of a thickness or a color of each of the plurality of contours included in the edge image; obtain an output image by overlaying or blending the edge image subjected to image processing on or with the pre-processed image; and display the output image through the display.

According to an example embodiment of the disclosure, a method of controlling a display apparatus includes: pre-processing an image; obtaining an edge image by identifying a contour corresponding to each of a plurality of objects included in the pre-processed image; performing image processing to adjust at least one of a thickness or a color of each of the plurality of contours included in the edge image; obtaining an output image by overlaying or blending the edge image subjected to image processing on or with the pre-processed image; and displaying the output image.

According to an example embodiment of the disclosure, a non-transitory computer-readable recording medium having recorded thereon a program which, when executed by at least one processor of an electronic device, causes the electronic device to perform operations comprising: pre-processing an image; obtaining an edge image by identifying a contour corresponding to each of a plurality of objects included in the pre-processed image; performing image processing to adjust at least one of a thickness or a color of each of the plurality of contours included in the edge image; obtaining an output image by overlaying or blending the edge image subjected to image processing on or with the pre-processed image; and displaying the output image.

BRIEF DESCRIPTION OF THE DRAWINGS

The above and/or other aspects, features and advantages of certain embodiments of the present disclosure will be more apparent from the following detailed description, taken in conjunction with the accompanying drawings, in which.

DETAILED DESCRIPTION

Figure 1:
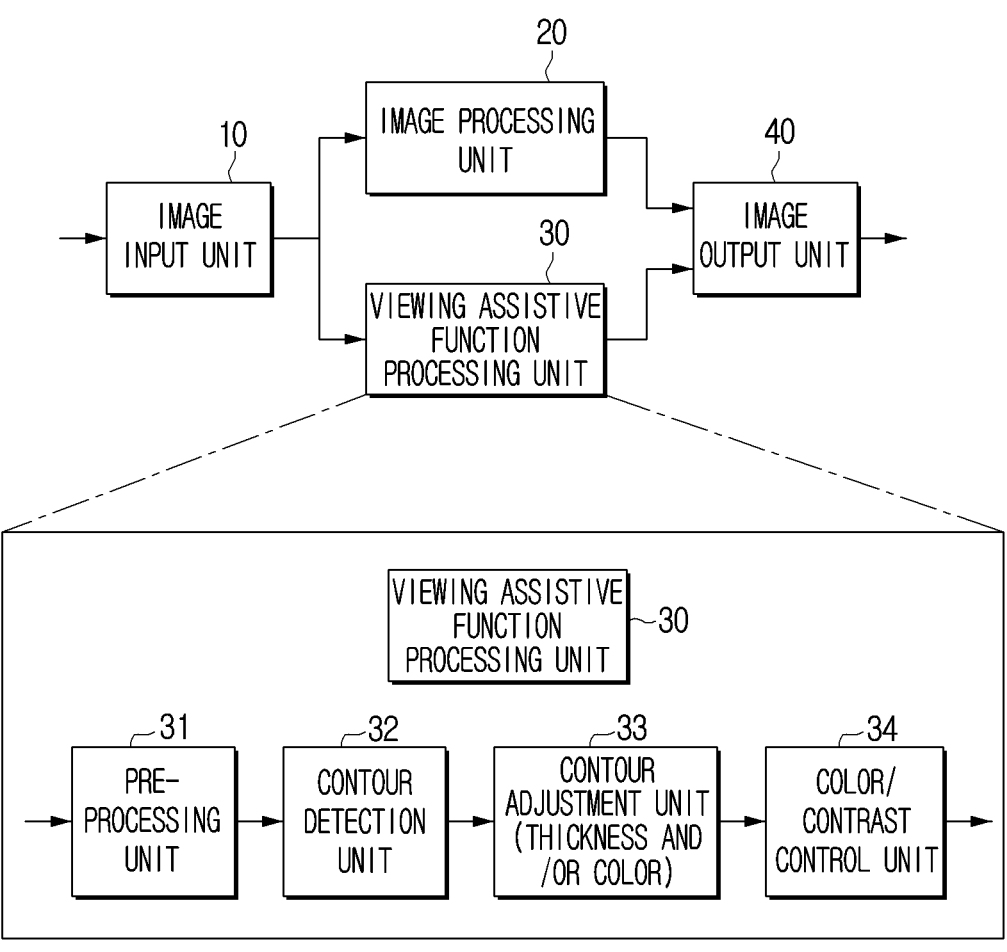
FIG. 1 is a diagram illustrating an example viewing assistive function processing unit according to various embodiments.

Hereinafter, the disclosure will be described in greater detail with reference to the accompanying drawings.

The terms used in describing the various example embodiments of the disclosure have been selected from general terms that are currently in wide use in consideration of the functions in the disclosure. However, the terms may have different meanings according to intentions of those skilled in the art, precedents, the emergence of new technologies, or the like. Also, various terms may be arbitrarily selected, and in this case, the meanings of the terms will be described in detail in the corresponding description portion of the disclosure. Therefore, the terms used herein should be defined based on the overall content of the disclosure together the meanings of the terms, not simply by the terms themselves.

In the disclosure, the expression "have", "may have", "include", "may include", or the like indicates the presence of stated features (e.g., numerical values, functions, operations, or components such as parts) and does not preclude the presence of additional features.

It should be understood that the expression "at least one of A and/or B" refers to "A", or "B", or "A and B".

The expressions "first", "second", and the like used in the disclosure may modify various components regardless of order and/or importance, and may be used to distinguish one component from another component, and do not limit the components.

It should further be understood that when a component (e.g., a first component) is referred to as being "(operatively or communicatively) coupled with/to" or "connected to" another component (e.g., a second component), this may refer, for example, to a component being coupled with/to or connected to another component directly or via an intervening component (e.g., a third component).

Singular expressions include plural expressions unless the context clearly indicates otherwise. It should be further understood that the term "include" or "comprise" used herein specify the presence of features, numerals, steps, operations, components, parts, or combinations thereof mentioned in the disclosure, but do not preclude the presence or addition of one or more other features, numerals, steps, operations, components, parts, or combinations thereof.

In the disclosure, a "module" or a "unit" may perform at least one function or operation, and may be implemented as hardware, software, or a combination of hardware and software. In addition, a plurality of "modules" or a plurality of "units" may be integrated into at least one module and may be implemented as at least one processor (not shown) except for "modules" or "units" that need to be implemented in specific hardware.

In the disclosure, the term "user" may refer to a person using an electronic device or a device (e.g., an artificial intelligence electronic device) using an electronic device.

Hereinafter, various embodiments of the disclosure will be described in greater detail with reference to the accompanying drawings.

FIG. 1 is a diagram illustrating an example viewing assistive function processing unit according to various embodiments.

A display apparatus 100 (refer to FIG. 2) according to various embodiments of the disclosure may provide an image. The display apparatus 100 may be implemented as a TV, but is not limited thereto, and any apparatus having a display function, such as a video wall, a large format display (LFD), a digital signage, a digital information display (DID), or a projector display, may be applied without limitation. In addition, the display apparatus 100 may be implemented using various types of displays, such as a liquid crystal display (LCD), an organic light-emitting diode (OLED), a liquid crystal on silicon (LCoS), a digital light processing (DLP), a quantum dot (QD) display panel, and a quantum dot light-emitting diode (QLED).

The display apparatus 100 according to an example of the disclosure may include an image input unit (e.g., including input circuitry) 10, an image processing unit (e.g., including image processing circuitry) 20, a viewing assistive function processing unit (e.g., including processing circuitry) 30, and an image output unit (e.g., including output circuitry) 40.

The image input unit 10 may be included in a communication interface including various communication circuitry configured to receive an image by communicating with an external device (a set top box, a cloud server, etc.). The image input unit 10 may obtain an image included in a memory.

According to an example, each of the image processing unit 20 and the viewing assistive function processing unit 30 may be included in one or more processors to process the received image, and provide the processed image through the image output unit 40 (e.g., a display). As used in the disclosure terms such as "processor", "processing unit" or the like, may include various processing circuitry. For example, and without limitation, as used herein, including the claims, the term "processor", "processing unit", or the like may include various processing circuitry, including at least one processor, wherein one or more processors of the at least one processor may be configured to perform the various functions described herein.

For example, the viewing assistive function processing unit 30 may include various processing circuitry and/or executable program instructions and perform image processing according to special purposes as well as general image processing for images.

For example, the viewing assistive function processing unit 30 may generate subtitles to be output together with the image processed through the image processing unit 20 for the convenience of a user with a hearing impairment.

For example, the viewing assistive function processing unit 30 may generate an image with improved visibility for the convenience of a user with a visual impairment (e.g., a person with low vision).

As an example, the viewing assistive function processing unit 30 may receive a processed image from the image processing unit 20, perform visibility enhancement processing on the processed image, and provide the image subjected to the visibility enhancement processing through a display.

As an example, the viewing assistive function processing unit 30 may receive an image from the image input unit 10 and perform visibility enhancement processing on the received image, and the display apparatus 100 may provide an image processed by the image processing unit 20 and an image subjected to visibility enhancement processing by the viewing assistive function processing unit 30 together through a display. For example, the display apparatus 100 may overlay or blend an image subjected to visibility enhancement processing by the viewing assistive function processing unit 30 on or with an image processed by the image processing unit 20 and provide the image obtained thereby so through a display.

For the convenience of users with visual impairments, conventional display apparatuses provide images in high contrast mode, enlarged images, or images on which a color inversion function has been performed.

However, there has been a demand for a visibility enhancement processing method in which a degree of visual impairment (a visual impairment grade), a feature of an image (for example, a feature of each of a plurality of objects included in an image), or the like is considered, rather than a uniform visibility enhancement processing method (for example, a method in which a feature of an image is not considered) as in the conventional display apparatuses.

The viewing assistive function processing unit 30 according to various embodiments of the disclosure may include a pre-processing unit (e.g., including processing circuitry and/or executable program instructions) 31, a contour detection unit (e.g., including processing circuitry and/or executable program instructions) 32, a contour adjustment unit (e.g., including processing circuitry and/or executable program instructions) 33, and a color and contrast control unit (e.g., including processing circuitry and/or executable program instructions) 34, and may perform visibility enhancement processing in consideration of a degree of visual impairment and a feature of an image. As an example, the viewing assistive function processing unit 30 may identify a contour corresponding to each of a plurality of objects included in an image, and perform visibility enhancement processing by adjusting at least one of a thickness or a color of the identified contour. The display apparatus 100 may overlay the image subjected to visibility enhancement processing by the viewing assistive function processing unit 30 on the image processed by the image processing unit 20, and output the image obtained thereby through the image output unit 40. The display apparatus 100 may blend the image subjected to visibility enhancement processing by the viewing assistive function processing unit 30 with the image processed by the image processing unit 20, and output the image obtained thereby through the image output unit 40.

Hereinafter, visibility enhancement processing methods of the viewing assistive function processing unit 30 according to various embodiments of the disclosure will be described in greater detail.

Figure 2:
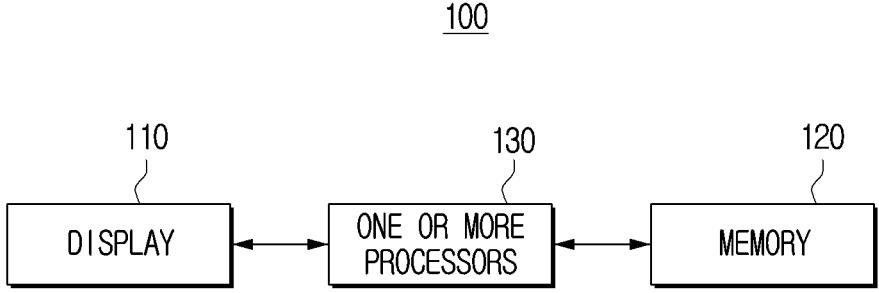
FIG. 2 is a block diagram illustrating an example configuration of a display apparatus according to various embodiments.

FIG. 2 is a block diagram illustrating an example configuration of a display apparatus according to various embodiments.

Referring to FIG. 2, the display apparatus 100 includes a display 110, a memory 120, and one or more processors (e.g., including various processing circuitry) 130.

The display 110 according to various embodiments of the disclosure may be implemented in various types of displays such as a liquid crystal display (LCD), an organic light-emitting diode (OLED), a liquid crystal on silicon (LCoS), a digital light processing (DLP), and a quantum dot (QD) display panel, a quantum dot light-emitting diode (QLED), a micro light-emitting diode (μLED), and a mini LED.

The display apparatus 100 may be implemented as a touch screen combined with a touch sensor, a flexible display, a rollable display, a 3D display, a display in which a plurality of display modules are physically connected to each other, or the like.

The memory 120 according to various embodiments of the disclosure may store data required for various embodiments of the disclosure.

The memory 120 may be implemented in the form of a memory embedded in the display apparatus 100 or in the form of a memory attachable to and detachable from the display apparatus 100, depending on the data storage purpose. For example, data for driving the display apparatus 100 may be stored in a memory embedded in the display apparatus 100, and data for an extended function of the display apparatus 100 may be stored in a memory attachable to and detachable from the display apparatus 100. Meanwhile, the memory embedded in the display apparatus 100 may be implemented as at least one of a volatile memory (e.g., a dynamic RAM (DRAM), a static RAM (SRAM), or a synchronous dynamic RAM (SDRAM)) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash), a hard drive, or a solid state drive (SSD)). In addition, the memory attachable to and detachable from the display apparatus 100 may be implemented in the form of, for example, a memory card (e.g., a compact flash (CF), a secure digital (SF), a micro secure digital (Micro-SD), a mini secure digital (Mini-SD), an extreme digital (xD), or a multi-media card (MMC)) or an external memory (e.g., a USB memory) connectable to a USB port.

According to an example, the memory 120 may store at least one instruction or a computer program including instructions for controlling the display apparatus 100.

According to various embodiments of the disclosure, various data may be stored in a memory outside the processor 120, and some of the data may be stored in a memory inside the processor 120 and the other of the data may be stored in a memory outside the processor 120.

The one or more processors 130 according to various embodiments of the disclosure control the overall operation of the display apparatus 100.

According to various embodiments of the disclosure, the processors 130 may be implemented as a digital signal processor (DSP) that processes a digital signal, a microprocessor, and a timing controller (TCON). However, the processors 130 are not limited thereto, and may include one or more of a central processing unit (CPU), a micro controller unit (MCU), a micro processing unit (MPU), a controller, an application processor (AP), a communication processor (CP), an ARM processor, and an artificial intelligence (AI) processor, or may be defined by those terms. In addition, the processor 130 may be implemented as a system on chip (SoC) having a built-in processing algorithm or a large scale integration (LSI), or may be implemented in the form of a field programmable gate array (FPGA). The processor 130 may perform various functions by executing computer executable instructions stored in the memory.

The one or more processors 130 may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The one or more processors 130 may control one or any combination of the other components of the electronic device, and may perform operations related to communication or data processing. The one or more processors 130 may execute one or more programs or instructions stored in the memory. For example, the one or more processors 130 may perform a method according to various embodiments of the disclosure by executing one or more instructions stored in the memory.

In a case where the method according to various embodiments of the disclosure includes a plurality of operations, the plurality of operations may be performed by one processor or by a plurality of processors. For example, when a first operation, a second operation, and a third operation are performed by the method according to various embodiments, all of the first operation, the second operation, and the third operation may be performed by the first processor, or the first operation and the second operation may be performed by the first processor (e.g., a general-purpose processor) and the third operation may be performed by the second processor (e.g., an artificial intelligence-dedicated processor).

The one or more processors 130 may be implemented as single core processors each including one core, or may be implemented by one or more multi-core processors each including a plurality of cores (e.g., multiple homogeneous cores or multiple heterogeneous cores). In a case where the one or more processors 130 are implemented as multi-core processors, each of the plurality of cores included in the multi-core processor may include a memory such as a cache memory or an on-chip memory inside the processor, and a common cache shared by the plurality of cores may be included in the multi-core processor. In addition, each of the plurality of cores (or some of the plurality of cores) included in the multi-core processor may independently read and execute program instructions for implementing the method according to various embodiments of the disclosure, or all (or some) of the plurality of cores may be linked to each other to read and execute program instructions for implementing the method according to various embodiments of the disclosure.

In a case where the method according to various embodiments of the disclosure includes a plurality of operations, the plurality of operations may be performed by one of the plurality of cores included in the multi-core processor, or may be performed by two or more of the plurality of cores. For example, when a first operation, a second operation, a third operation are performed by the method according to various embodiments, all of the first operation, the second operation, and the third operation may be performed by a first core included in the multi-core processor, or the first operation and the second operation may be performed by the first core included in the multi-core processor, and the third operation may be performed by a second core included in the multi-core processor.

In the embodiments of the disclosure, the processor may refer to a system on chip (SoC) in which one or more processors and the other electronic components are integrated, a single-core processor, a multi-core processor, or a core included in the single-core processor or the multi-core processor. Here, the core may be implemented as a CPU, a GPU, an APU, an MIC, a DSP, an NPU, a hardware accelerator or a machine learning accelerator, but the embodiments of the disclosure are not limited thereto.

In FIG. 1, the one or more processors 130 are expressed as image processing unit 20 and viewing assistive function processing unit 30 for convenience of explanation, but each of the image processing unit 20 and the viewing assistive function processing unit 30 may be included in the one or more processors 130 as described above. Hereinafter, an operation of each of the image processing unit 20 and the viewing assistive function processing unit 30 will be described as an operation of the one or more processors 130.

For example, the one or more processors 130 according to an example may display a region that is meaningful to a user with a visual impairment in an image in a visibility-enhanced manner and display the other region in a blurred manner.

The one or more processors 130 according to an example may obtain an edge image by pre-processing an image and identifying a contour corresponding to each of a plurality of objects included in the pre-processed image.

The one or more processors 130 may perform image processing for adjusting at least one of a thickness or a color of each of the plurality of contours included in the edge image.

The one or more processors 130 may obtain an output image by overlaying or blending the edge image subjected to image processing on or with the pre-processed image, and display the output image through the display 110. This will be described in greater detail below with reference to FIG. 3.

Figure 3:
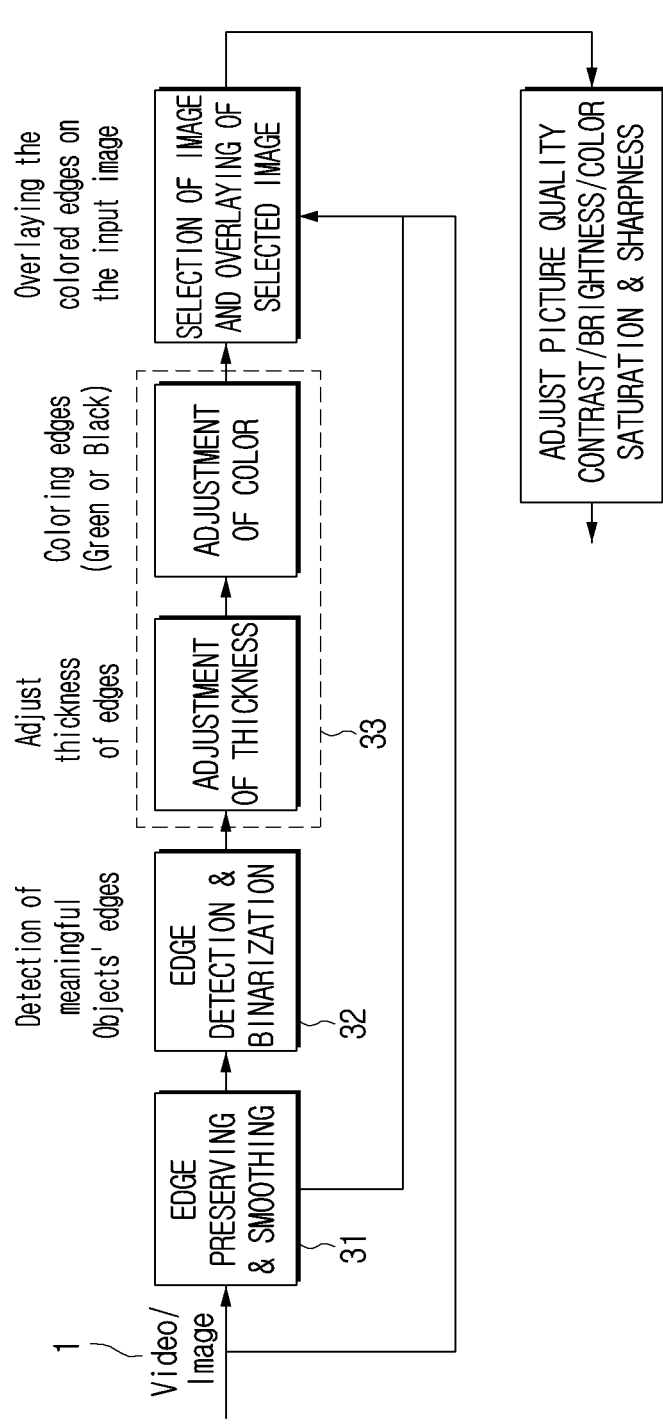
FIG. 3 is a diagram illustrating an example contour processing operation according to various embodiments.

FIG. 3 is a diagram illustrating an example contour processing operation according to various embodiments.

The one or more processors 130 according to an example of the disclosure may pre-process an image 1 (31). For example, the one or more processors 130 may perform texture filtering on the image 1 to perform flattening processing on detail textures included in the image. The texture filtering may include Gaussian smoothing, edge-preserving & smoothing, edge-preserving filtering, or the like.

According to an example, the one or more processors 130 may perform flattening processing by maintaining strong edges in the image 1 and removing weak edges, noise, textures, etc. according to a filtering strength of a texture filter (e.g., a bilateral filter). Here, the image subjected to flattening processing may be referred to as a smoothing image because it includes only strong edges.

The edge may refer, for example, to a portion where a pixel value rapidly changes in an image, and may include a boundary between a dark pixel and a bright pixel, a boundary between objects, or a boundary between an object and a background. This will be described in greater detail below with reference to FIG. 4.

The one or more processors 130 according to an example may obtain a pre-processed image by performing de-noising processing on the image 1. The de-noising processing may include processing of removing noise included in the image 1 by applying a de-noising filter to the image 1.

The one or more processors 130 according to an example may obtain an edge image by identifying a contour corresponding to each of a plurality of objects included in the pre-processed image (32).

For example, the one or more processors 130 may include a contour corresponding to at least one of the plurality of objects included in the pre-processed image. For example, the one or more processors 130 may obtain an edge image including a contour corresponding to an object that is meaningful to a user with a visual impairment among the plurality of objects. This will be described in detail with reference to FIGS. 5 and 6.

As an example, the one or more processors 130 may obtain an edge image by performing image binarization (or image thresholding) on the pre-processed image. Here, the image binarization may be an example of image segmentation or image classification.

The one or more processors 130 may perform image processing for adjusting at least one of a thickness or color of each of the plurality of contours included in the edge image (33).

For example, the one or more processors 130 may perform image processing for adjusting a contour corresponding to at least one object that satisfies a predetermined (e.g., specified) condition among the plurality of objects to be relatively thicker than contours corresponding to the other objects.

The predetermined condition may include a condition for identifying a meaningful object in the image 1, for example, a text object, a human object, an object having a critical or larger size, or an object located in an area within a screen (e.g., an object located in a central area within the screen). However, this is an example, and the predetermined condition is not limited thereto. For example, the one or more processors 130 may perform image processing for adjusting a contour corresponding to a specific object to be relatively thicker than contours corresponding to the other objects based on metadata of the image 1.

For example, the one or more processors 130 may perform image processing for adjusting a plurality of contours included in the edge image to a color corresponding to a user command. For example, colors having high visibility for a person with low vision may be yellow, green, white, and black. The one or more processors 130 may adjust a plurality of contours included in the edge image to a color corresponding to a user command.

The one or more processors 130 according to an example may identify an average pixel value of pixels adjacent to the contour. For example, the one or more processors 130 may identify an average pixel value of a plurality of pixels included in an M×N area around the contour, and identify a color that increases contrast sensitivity between the contour and the plurality of pixels based on the identified average pixel value. For example, if the average pixel value is yellow, the one or more processors 130 may identify black (or blue), which has a complementary color relationship with yellow and has high contrast sensitivity to yellow. Subsequently, the one or more processors 130 may adjust the contour to black.

As described above, based on performing image processing for adjusting at least one of the thickness or the color of the contour corresponding to each of the plurality of objects included in the edge image, the one or more processors 130 may obtain an output image by overlaying the edge image subjected to the image processing on the pre-processed image (34).

The output image may refer to an image with improved visibility for a person with low vision to identify (or recognize or distinguish) each of a plurality of objects, because it is an image obtained by overlaying an edge image, in which at least one of a thickness or a color of an contour corresponding to each of the plurality of objects or a contour corresponding to a meaningful object among the plurality of objects is adjusted, on a pre-processed image (or a smoothing image).

Although an embodiment in which the one or more processors 130 obtain an output image by overlaying an edge image subjected to image processing on a pre-processed image is illustrated in FIG. 3, the disclosure is not limited thereto. The one or more processors 130 may obtain an output image by blending an edge image subjected to image processing with a pre-processed image.

The one or more processors 130 may post-process the output image and then display the post-processed output image through the display 110. The post-processing may include image processing for adjusting the contrast, brightness, saturation, sharpness, and the like of the output image, noise filtering, or the like.

Figure 4:
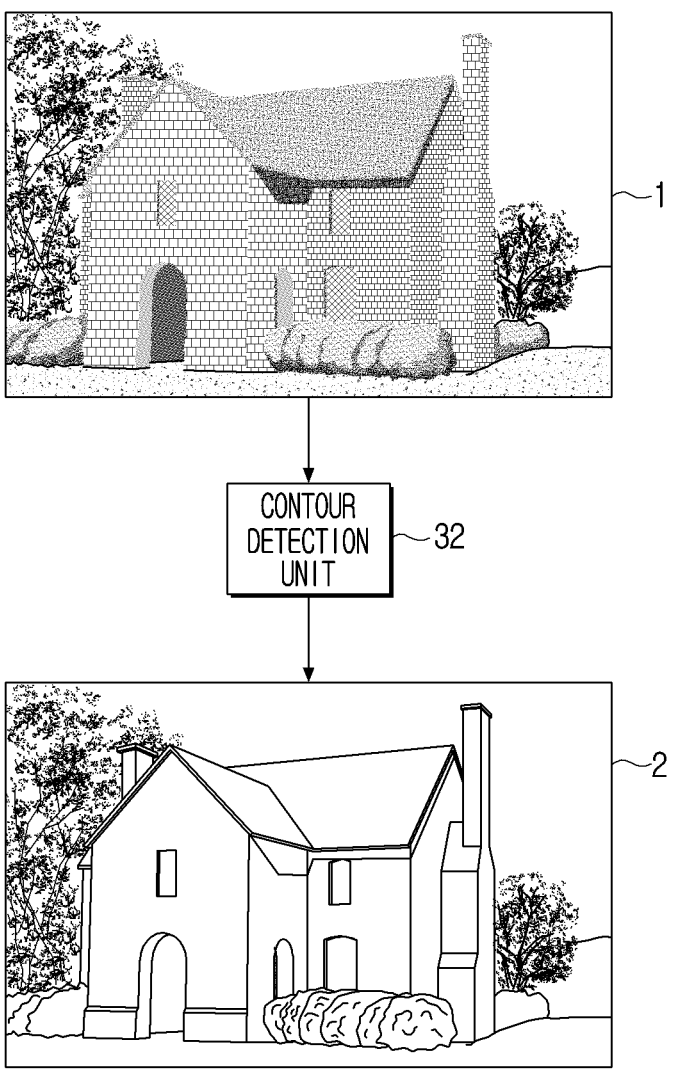
FIG. 4 is a diagram illustrating example contour according to various embodiments.

FIG. 4 is a diagram illustrating example contour according to various embodiments.

The display apparatus 100 according to various embodiments of the disclosure is capable of displaying an image with improved visibility for a meaningful object, while removing (or blurring) detail textures, because the detail textures in the image 1 are not easy for a person with low vision to identify.

As described in 31 and 32 of FIG. 3, the one or more processors 130 may perform pre-processing on the image. As an example, the one or more processors 130 may perform pre-processing by applying a texture filter to the image 1. For example, the one or more processors 130 may smooth detail textures while preserving edges in image 1, using, for example, a bilateral filter, weighted least squares, edge-avoiding wavelets, local histogram filtering, a Laplacian pyramid, an approaching method for switching a domain, an optimization method for minimizing and/or reducing an L0 gradient, or the like. However, the one or more processors 130 may perform flattening processing on detail textures while preserving the edges in the image 1 using various methods in addition to the above-described methods.

The one or more processors 130 may identify a contour corresponding to each of the plurality of objects included in the pre-processed image. For example, the one or more processors 130 may identify a contour corresponding to each of the plurality of objects using various conventional contour identification algorithms. For example, the one or more processors 130 may obtain an edge image including a contour corresponding to each of the plurality of objects by performing image binarization (or image thresholding) on the pre-processed image.

Figure 5:
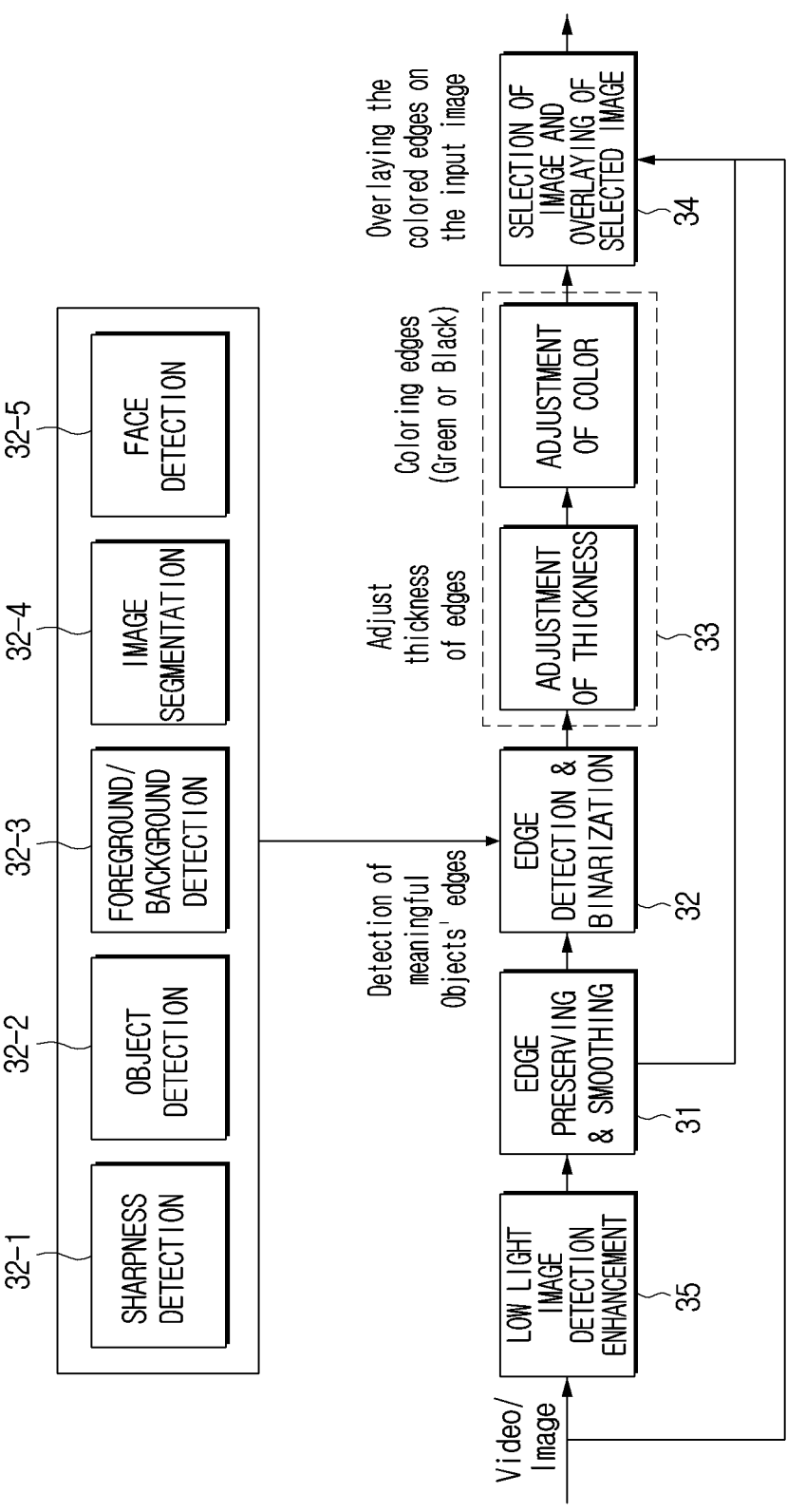
FIG. 5 is a diagram illustrating example pre-processing according to various embodiments.

FIG. 5 is a diagram illustrating example pre-processing according to various embodiments.

The one or more processors 130 according to various embodiments of the disclosure may perform additional pre-processing on the image 1 as well as flattening processing.

Referring to FIG. 5, the one or more processors 130 may identify whether brightness information of the image 1 is greater than or equal to a threshold value. Based on the brightness information being less than the threshold value, the one or more processors 130 may preferentially perform low light image enhancement on the image (35).

The brightness information may be an average picture level (APL) of an image. For example, the brightness information is an average grayscale value of pixels of an image, and the higher the APL, the relatively brighter the image, and the lower the APL, the relatively darker the image. However, this is an example, and the brightness information may be a maximum grayscale value, a highest-frequent grayscale value, or the like. The low light image enhancement will be described in greater detail below with reference to FIG. 6.

Figure 6:
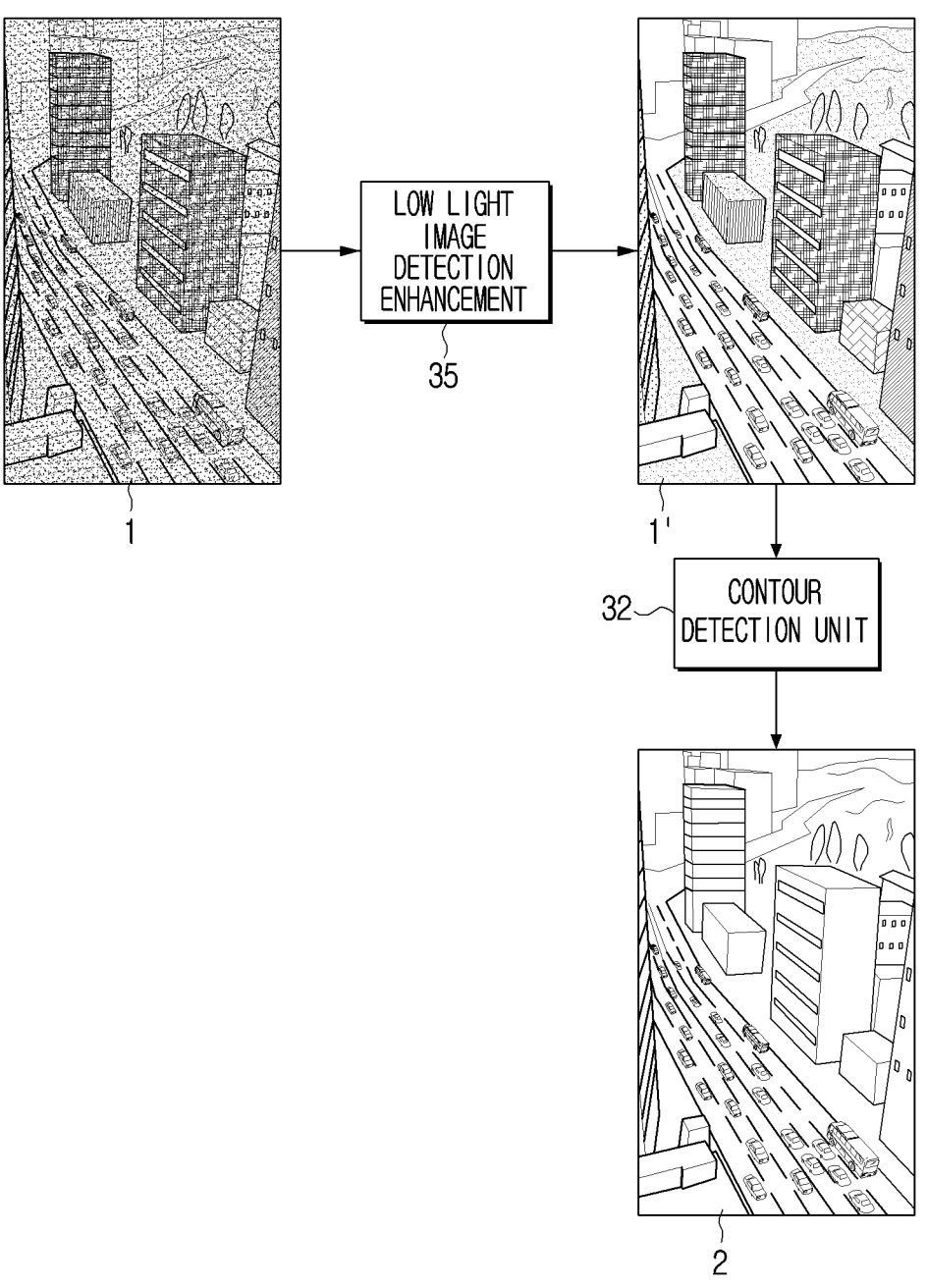
FIG. 6 is a diagram illustrating an example pre-processed image according to various embodiments.

FIG. 6 is a diagram illustrating an example pre-processed image according to various embodiments.

Referring to FIG. 6, based on the brightness information of the image 1 being less than the threshold value, the one or more processors 130 may perform low light image enhancement on the image 1 to obtain a pre-processed image 1', and the brightness information of the pre-processed image 1' may be greater than or equal to the threshold value (35).

As an example, the one or more processors 130 may adjust a histogram of the image 1 by performing histogram equalization (HE) on the image 1 to enhance the brightness of the low-light image. In addition, the one or more processors 130 may obtain an image with improved brightness, that is, a pre-processed image 1' by inputting the image 1 to a neural network model. Here, the neural network model may be a model trained to enhance brightnesses of low-light images.

However, this is merely an example, and the one or more processors 130 may perform pre-processing for enhancing the brightness of the image 1 using various algorithms.

As illustrated in FIG. 5, the one or more processors 130 may obtain a pre-processed image 1' by enhancing brightness (35) and performing texture flattening processing (31). Subsequently, the one or more processors 130 may obtain an edge image by identifying contours in the pre-processed image 1'. This will be described in greater detail below with reference to FIG. 7.

Figure 7:
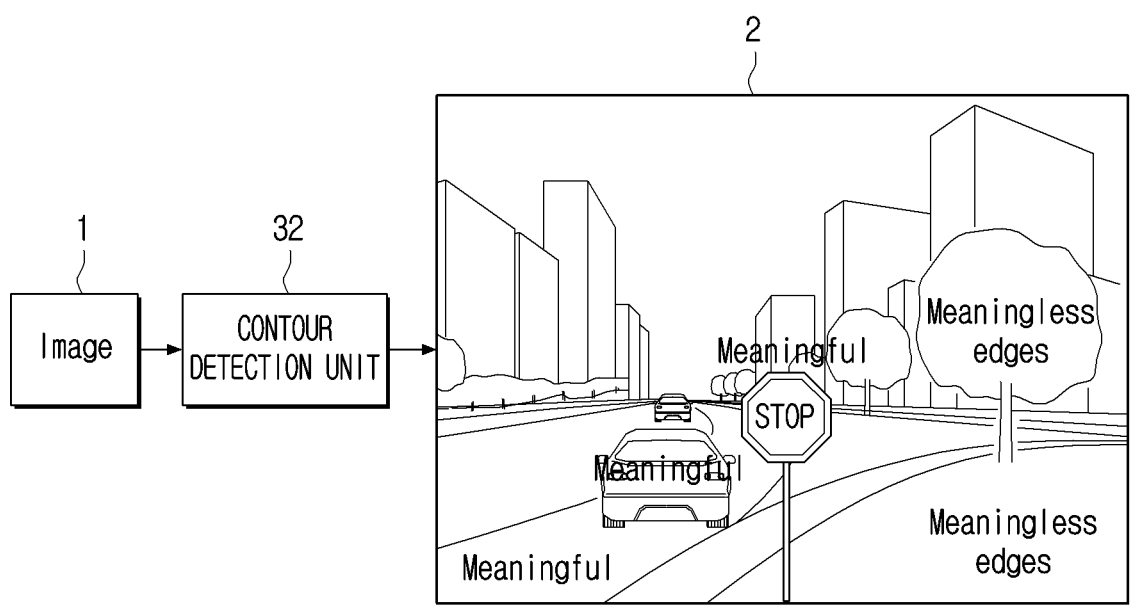
FIG. 7 is a diagram illustrating an example method of obtaining an edge image according to various embodiments.

FIG. 7 is a diagram illustrating an example method of obtaining an edge image according to various embodiments.

As an example, the one or more processors 130 may detect the sharpness of the pre-processed image 1' as illustrated in FIG. 5 (32-1). Among the plurality of objects included in the pre-processed image 1', a strong-edge object may have relatively high sharpness, and a weak-edge object may have relatively low sharpness. By detecting the sharpness of the pre-processed image 1', the one or more processors 130 may identify a contour corresponding to each of the plurality of objects included in the pre-processed image 1'.

The one or more processors 130 according to an example may identify each of the plurality of objects included in the pre-processed image 1' (32-2). For example, the one or more processors 130 may identify each of the plurality of objects included in the pre-processed image 1' using a conventional object detection algorithm, or may identify each of the plurality of objects by inputting the pre-processed image 1' to the neural network model. Subsequently, the one or more processors 130 may identify contours based on the identified plurality of objects.

The one or more processors 130 according to an example may identify a background in the pre-processed image 1' (32-3). For example, the one or more processors 130 may separate a background from the plurality of objects in the pre-processed image 1' using a conventional background separation algorithm (or a background detection algorithm), and identify the separated background.

The one or more processors 130 according to an example may identify a contour corresponding to each of the plurality of objects by performing image segmentation (e.g., image binarization or image thresholding) on the pre-processed image 1' (32-4).

The one or more processors 130 according to an example may identify a face (or human shape) object included in the pre-processed image 1' using a face detection algorithm (32-5).

In addition, the one or more processors 130 according to an example may identify a face object (or a human object) by inputting the pre-processed image 1' to the neural network model. For example, the one or more processors 130 may identify a face object included in the pre-processed image 1' using a neural network model trained to identify a face object, considering that the face object is identified with a lot of variables depending on lighting and race because the face object has many curves and includes a plurality of internal boundaries (e.g., eyes, a nose, a mouth, and ears).

The one or more processors 130 according to an example may identify an object that is meaningful to a person with low vision from among the plurality of identified objects, or a region that is meaningful to a person with low vision from among the plurality of regions of the image 1.

Referring to FIG. 7, the one or more processors 130 may identify at least one object that satisfies a predetermined condition from among the plurality of objects.

The predetermined condition may include, for example, a condition for identifying a meaningful object in the image 1, for example, a text object, a human object, an object having a critical or larger size, or an object located in an area within a screen (e.g., an object located in a central area within the screen). However, this is an example, and the predetermined condition is not limited thereto.

For example, the one or more processors 130 may identify a region of interest (ROI) from among a plurality of regions of the image 1. Here, the region of interest may refer to a meaningful region.

As an example, the one or more processors 130 may identify a region of interest (ROI) from among the plurality of regions of the image 1 by inputting the image 1 to a neural network model. Here, the neural network model may be a model trained to identify at least one of a region including an object, a region in which a motion has occurred, a color change region, or a luminance change region, as a region of interest, from among the plurality of regions.

As described above, the one or more processors 130 may adjust a thickness or a color of a contour corresponding to at least one object identified as a meaningful object from among the plurality of objects in the edge image 2 or at least one region identified as a meaningful region from among the plurality of regions in the edge image 2 (33, 34).

For example, the one or more processors 130 may perform image processing for adjusting a contour corresponding to at least one object that satisfies a predetermined condition among the plurality of objects to be relatively thicker than contours corresponding to the other objects.

For example, the one or more processors 130 may perform image processing for adjusting a contour corresponding to at least one object that satisfies a predetermined condition among the plurality of objects to a different color from contours corresponding to the other objects. For example, the one or more processors 130 may adjust a contour corresponding to at least one object that satisfies a predetermined condition among the plurality of objects to a color preferred by a person with low vision (or a color with high visibility for a person with low vision). As another example, among the plurality of objects, the one or more processors 130 may adjust a contour corresponding to a text object to yellow, adjust a contour corresponding to a human object to green, adjust a contour corresponding to an object having a critical or larger size to white, and adjust a contour corresponding to an object located in an area to black.

The one or more processors 130 according to an example of the disclosure may obtain a depth map corresponding to the image 1.

The one or more processors 130 may increase a thickness of a contour corresponding to a first object located at a relatively short distance among the plurality of objects based on the depth map. The one or more processors 130 may decrease a thickness of a contour corresponding to a second object located at a relatively long distance among the plurality of objects based on the depth map.

The depth map may refer to an image channel including information related to a distance from an observation viewpoint in the image 1 for each region, for each pixel, or for each object.

According to an example, an object located at a relatively short distance among the plurality of objects may be a more meaningful object than the other objects, and thus, the one or more processors 130 may increase a thickness of a contour corresponding to the object located at a short distance.

The one or more processors 130 may obtain a pre-processed image 1' by performing texture filtering with different intensities on the plurality of objects, respectively, based on the depth map. According to an example, an object located at a relatively long distance among the plurality of objects may not be a more meaningful object than the other objects, and thus, the one or more processors 130 may filter a texture of the object located at a long distance with a higher intensity.

The one or more processors 130 may identify a region of interest (ROI) from among the plurality of regions of the image 1, and perform texture filtering with a high intensity on the other region except the region of interest to blur the other region. For example, the one or more processors 130 may identify a background, blur the background, and perform texture filtering with a low intensity on each of the plurality of objects excluding the background.

Figure 8:
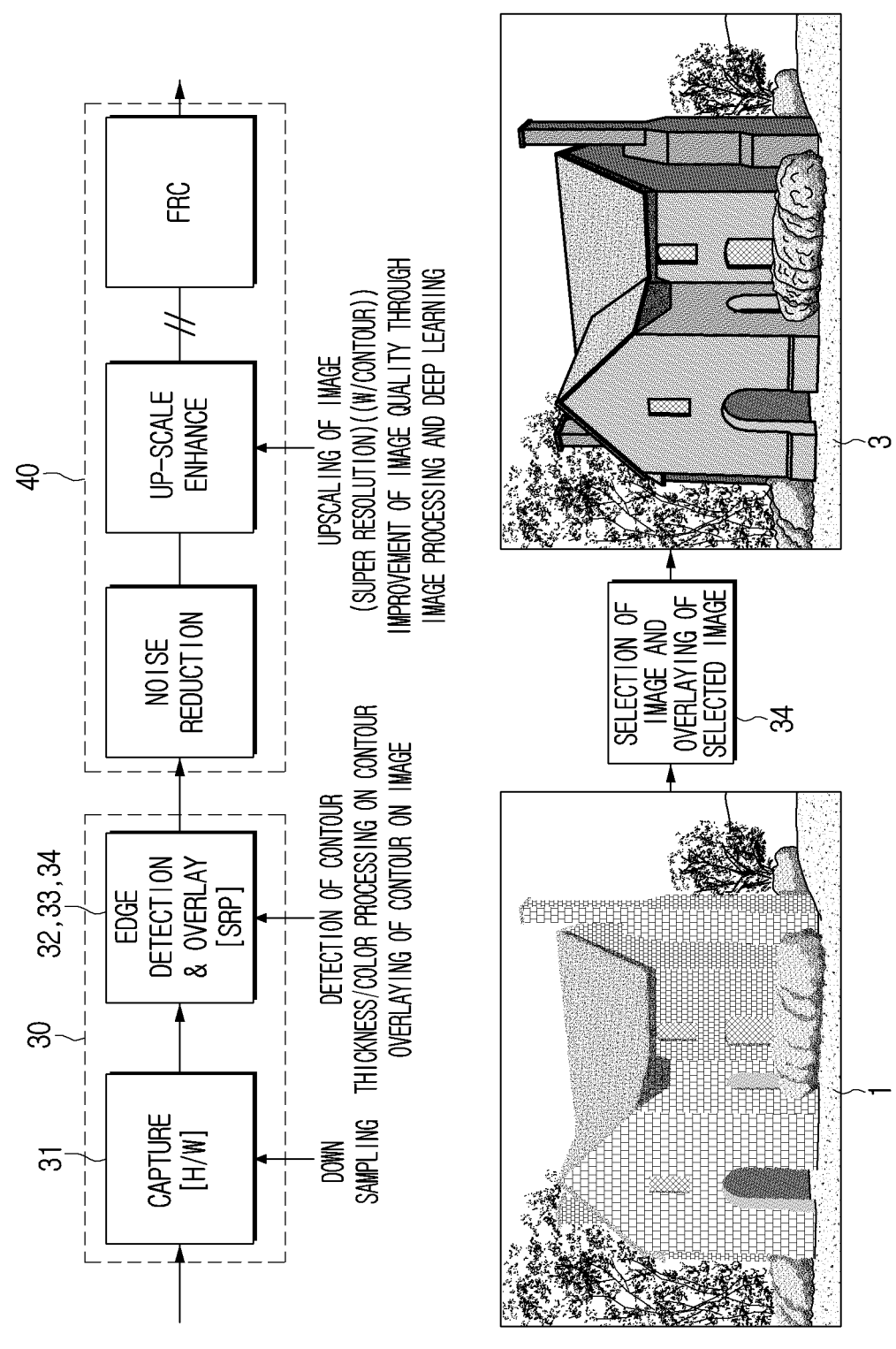
FIG. 8 is a diagram illustrating an example overlaid image according to various embodiments.

FIG. 8 is a diagram illustrating an example overlaid image according to various embodiments.

The one or more processors 130 according to an example of the disclosure may obtain an output image 3 by overlaying the edge image 2, in which a contour is adjusted, on the image 1 (or the pre-processed image 1') (34).

The output image 3 may be an image with improved visibility for a person with low vision in which while detail textures have been subjected to flattening processing, a contour corresponding to a meaningful object among a plurality of objects or a meaningful region among a plurality of regions has been adjusted to be relatively thicker than the other contours and to be of a different color from the other contours.

According to various embodiments of the disclosure, the one or more processors 130 may perform post-processing (40) on the output image 3. As an example, the one or more processors 130 may provide the output image through the display 110 after performing noise filtering thereon.

The one or more processors 130 may provide the output image 3 (or the output image 3' subjected to noise filtering) through the display 110 after performing frame rate conversion (FRC) thereon.

The one or more processors 130 according to various embodiments of the disclosure may obtain an output image 3 by blending (or alpha-blending) the edge image 2, in which a contour is adjusted, with the image 1 (or the pre-processed image 1').

For example, the one or more processors 130 may obtain an output image 3 by applying a weight value W to a pixel value of each pixel included in the edge image 2, in which a contour is adjusted, applying a weight value 1−W to a pixel value of a pixel corresponding to the contour in the image 1, and then summing up the pixel values to which the weight values are applied. A method of obtaining an output image 3 by blending the edge image 2, in which a contour is adjusted, with the image 1 by the one or more processors 130 may be expressed by Equation 1 below.

$$\text{Output}[x,y] = W*\text{Edge}[x,y] + (1-W)*\text{Input}[x,y] \qquad \text{[Equation 1]}$$

Here, Edge[x,y] may denote a pixel value of a pixel located at coordinates (x, y) in the edge image 2 in which the contour is adjusted, and Input[x, y] may denote a pixel value of a pixel located at coordinates (x, y) in the image 1.

The weight value W may be adjusted depending on the characteristics of the image or the degree of visual impairment (or the visual impairment grade). For example, the higher the degree of visual impairment (e.g., the lower the visual impairment grade) is, the closer the weight value W may be adjusted to 1 in the range of 0 to 1. The contour in the output image is naturally emphasized as compared to that in the original image (e.g., the image 1), and as a result, the one or more processors 130 is capable of providing an image with improved visibility to a user with a visual impairment.

The one or more processors 130 according to various embodiments of the disclosure may downscale the image 1 and identify an edge image 2 from the downscaled image. This will be described in greater detail below with reference to FIG. 9.

Figure 9:
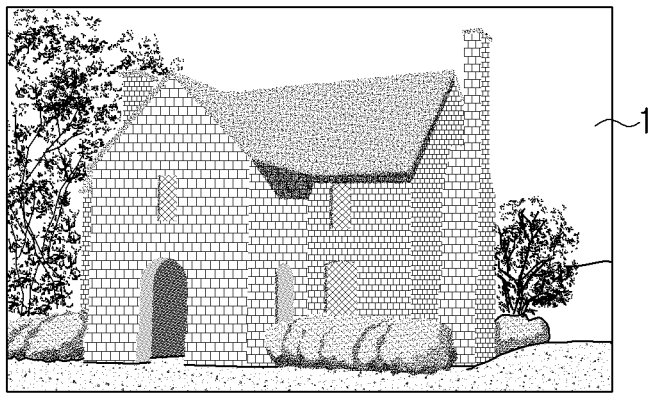
FIG. 9 is a diagram illustrating an example downscaled image according to various embodiments.
Figure 9:
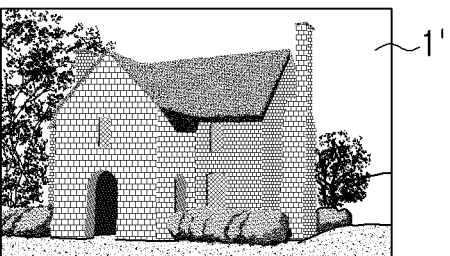
Figure 9:
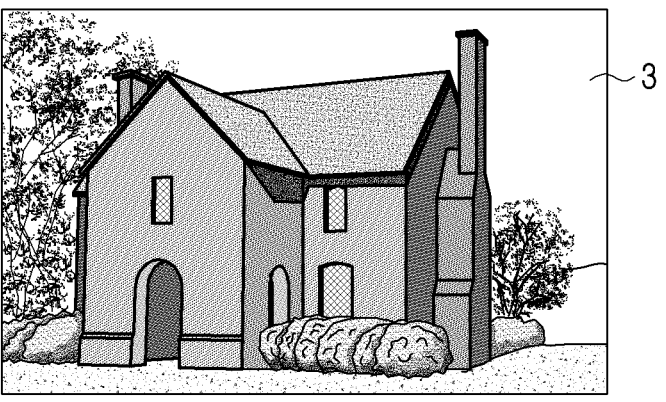

FIG. 9 is a diagram illustrating an example downscaled image according to various embodiments.

The one or more processors 130 according to an example pre-process the image 1, and the pre-processing may include downscaling as well as the flattening processing and the low light image enhancement processing, which are described above.

The one or more processors 130 may downscale the image 1 to obtain a downscaled image, that is, a pre-processed image 1'.

The one or more processors 130 may obtain an edge image 2 from the downscaled image, and perform image processing for adjusting at least one of a thickness or a color of each of a plurality of contours included in the edge image.

The one or more processors 130 may obtain an output image 3 by overlying the edge image subjected to image processing on the pre-processed image 1' or by blending the edge image subjected to image processing with the pre-processed image 1'.

The one or more processors 130 may perform post-processing (40) on the output image 3, and the post-processing (40) may include upscaling as well as the noise filtering and the frame rate control (FRC), which are described above.

The one or more processors 130 may obtain an upscaled output image, e.g. a post-processed output image 3', by upscaling the output image 3. The one or more processors 130 may output the post-processed output image 3'.

The one or more processors 130 may perform post-processing (40) for adjusting the contrast, brightness, saturation, sharpness, and the like of the output image. For example, the one or more processors 130 may obtain an output image 3' subjected to post-processing (40) (or image quality improvement processing) by inputting the output image 3 to a neural network model. The neural network model may be a model trained to perform image quality improvement processing, image quality enhancement processing, and upscaling on an image input thereto.

Artificial intelligence-related functions according to the disclosure are operated through the processor 130 and the memory of the display apparatus 100.

The processor 130 may include one or more processors. In this case, the one or more processors may include at least one of a central processing unit (CPU), a graphic processing unit (GPU), or a neural processing unit (NPU), but is not limited to the foregoing examples of processors.

The CPU, which is a general-purpose processor capable of performing not only general calculations but also artificial intelligence calculations, is capable of efficiently executing complex programs through a multi-layer cache structure. The CPU is advantageous for a serial processing method that enables organic linkage between a previous calculation result and a next calculation result through sequential calculations. The general-purpose processor is not limited to the above-described example unless specified as a CPU as described above.

The GPU, which is a processor for mass operations such as floating-point operations used for graphics processing, is capable of performing large-scale operations in parallel by integrating a large number of cores. For example, the GPU may be advantageous for a parallel processing method such as a convolution operation, as compared to the CPU. In addition, the GPU may be used as a co-processor to supplement the function of the CPU. The processor for mass operations is not limited to the above-described example unless specified as a GPU as described above.

The NPU may refer, for example, to a processor specialized in artificial intelligence calculations using an artificial neural network, and each layer of the artificial neural network may be implemented as hardware (e.g., silicon). In this case, the NPU is specially designed as requested by a company, and thus has a lower degree of freedom than the CPU or GPU, but is capable of efficiently processing artificial intelligence calculations required by the company. Meanwhile, as a processor specialized in artificial intelligence calculations, the NPU may be implemented in various forms such as a tensor processing unit (TPU), an intelligence processing unit (IPU), and a vision processing unit (VPU). The artificial intelligence processor is not limited to the above-described example unless specified as an NPU as described above.

The one or more processors may be implemented as a system on chip (SoC). In this case, the SoC may further include a memory and a network interface such as a bus for data communication between the processors and the memory in addition to the one or more processors.

In a case where the system on chip (SoC) included in the display apparatus 100 includes a plurality of processors, the display apparatus 100 may perform artificial intelligence-related calculations (e.g. operations related to the learning or inference of the artificial intelligence model) using some of the plurality of processors. For example, the display apparatus 100 may perform artificial intelligence-related calculations using at least one of a GPU, an NPU, a VPU, a TPU, or a hardware accelerator, which are specialized in artificial intelligence calculations such as a convolution operation and a matrix multiplication operation, among the plurality of processors. However, this is merely an embodiment, and artificial intelligence-related calculations may be performed using a general-purpose processor such as a CPU.

In addition, the display apparatus 100 may perform calculations for artificial intelligence-related functions using multiple cores (e.g., dual cores or quadruple cores) included in one processor. For example, the display apparatus 100 may perform artificial intelligence operations, such as a convolution operation and a matrix multiplication operation, in parallel using multiple cores included in the processor.

The one or more processors may perform control to process input data according to a predefined operating rule or an artificial intelligence model stored in the memory. The predefined operating rule or artificial intelligence model is created through learning.

The creation of the predefined operating rule or artificial intelligence model through learning may refer, for example, to the predefined operating rule or the artificial intelligence model with desired characteristics being created by applying learning algorithms to a large number of pieces of learning data. Such learning may be performed in the apparatus itself in which artificial intelligence is performed according to the disclosure, or may be performed through a separate server/system.

The artificial intelligence model may include a plurality of neural network layers. At least one layer has at least one weight value, and a layer operation is performed through a result of a previous layer operation and at least one defined operation. Examples of neural networks include a convolutional neural network (CNN), a deep neural network (DNN), a recurrent neural network (RNN), a restricted boltzmann machine (RBM), a deep belief network (DBN), a bidirectional recurrent deep neural network (BRDNN), a deep Q-network, and a transformer, and the neural network in the disclosure is not limited to the above-described examples unless specified.

The learning algorithm may refer, for example, to a technique by which a predetermined target device (e.g., a robot) is trained using a large number of pieces of learning data so that the predetermined target device is enabled to make a decision or make a prediction by itself. Examples of learning algorithms include supervised learning, unsupervised learning, semi-supervised learning, and reinforcement learning, and the learning algorithm in the disclosure is not limited to the above-described examples unless specified.

Figure 10:
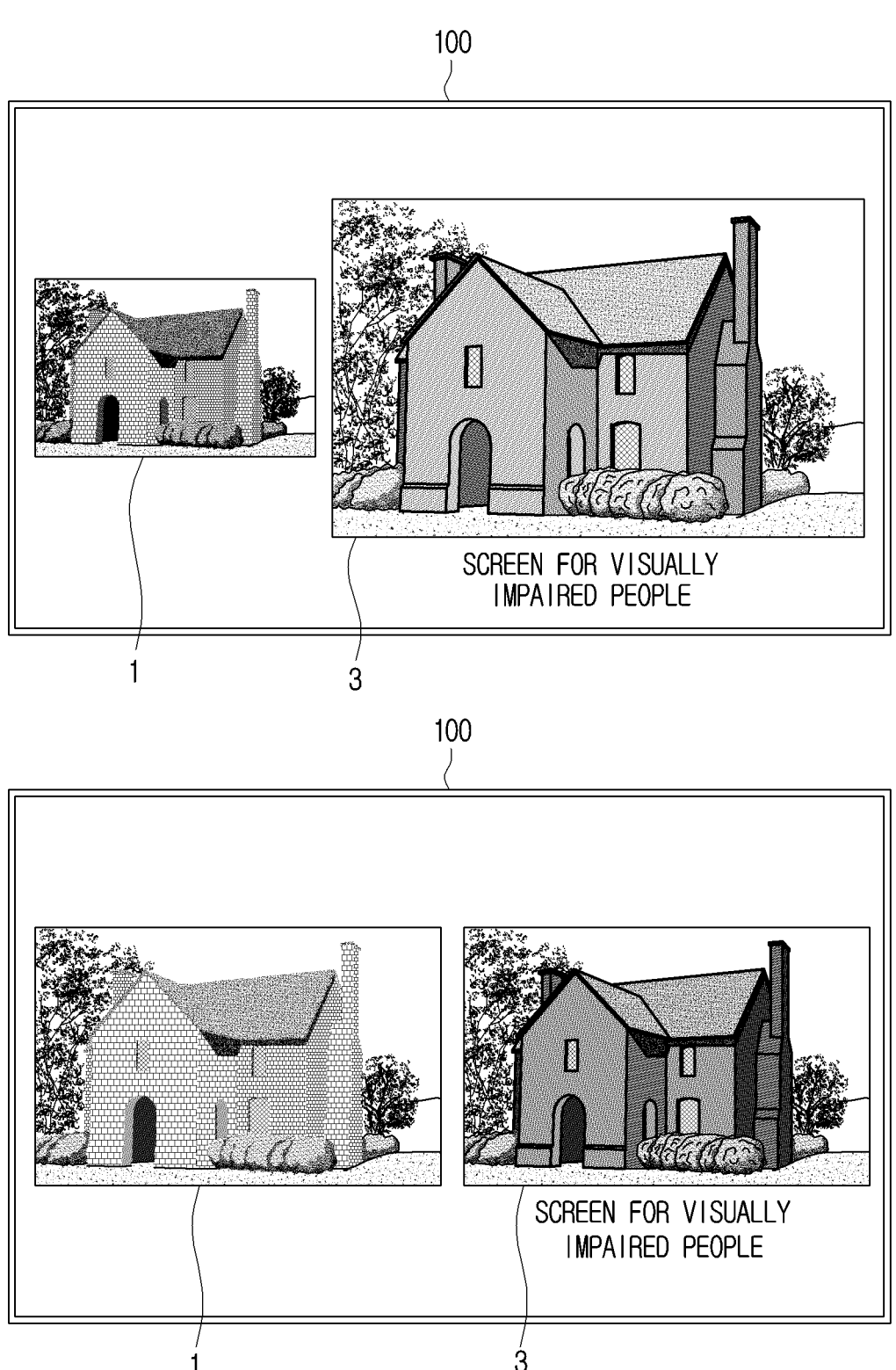
FIG. 10 is a diagram illustrating an example multi-view mode according to various embodiments.

FIG. 10 is a diagram illustrating an example multi-view mode according to various embodiments.

Referring to FIG. 10, the display apparatus 100 according to various embodiments of the disclosure may provide a multi-view mode. The multi-view mode may be a mode in which, for the same image, the image 1 (e.g., the original image) is displayed in a first area, and the output image 3 (or the post-processed (40) output image 3') is displayed in a second area.

For example, if a plurality of users simultaneously use the display apparatus 100 and some of the plurality of users are persons with low vision, the display apparatus 100 may simultaneously display the image 1 and the output image 3 corresponding to the same image using the multi-view mode of the display apparatus 100.

The locations and sizes of the first and second areas may be modified in various ways. For example, the multi-view mode may provide a picture in picture (PIP) function. As an example, the one or more processors 130 may display the image 1 in the entire area and display the output image 3 in a partial portion of the entire area, or vice versa, through the PIP function in the multi-view mode.

Figure 11:
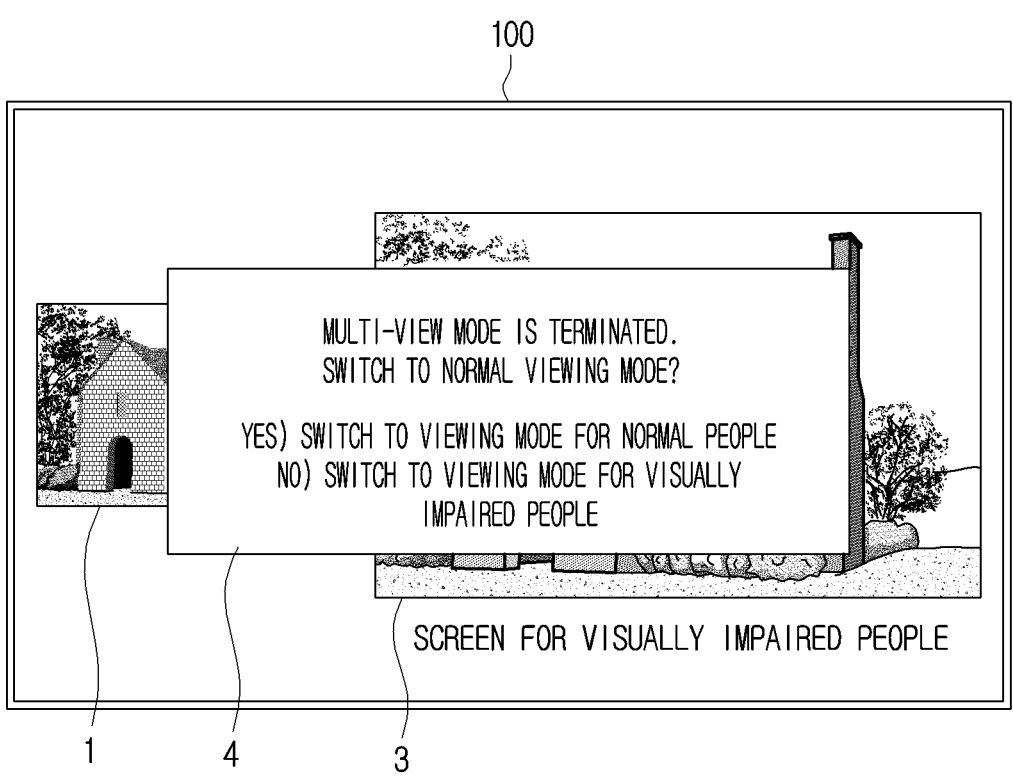
FIG. 11 is a diagram illustrating an example user interface (UI) related to the multi-view mode according to various embodiments.

FIG. 11 is a diagram illustrating an example user interface (UI) related to the multi-view mode according to various embodiments.

Referring to FIG. 11, when the multi-view mode is terminated, the one or more processors 130 may provide a UI for selecting one of a viewing mode for normal people and a viewing mode for visually impaired people.

The one or more processors 130 according to an example may display the image 1 in the entire area of the display 110 when the viewing mode for normal people is selected, and display the output image 3 in the entire area of the display 110 when the viewing mode for visually impaired people is selected from the pop-up dialog box 4 of the UI.

Referring to FIG. 2, the one or more processors 130 may perform image processing for adjusting at least one of a thickness or a color of each of a plurality of contours included in an edge image based on a degree of visual impairment (or a visual impairment grade).

For example, if the visual impairment is classified into grades 1 to 6, the display apparatus 100 may include an image processing method corresponding to each the grades 1 to 6.

For example, since the grade becomes lower as the degree of visual impairment is higher, each of the plurality of contours included in the edge image in the image processing method corresponding to grade 1 may be adjusted to be relatively thicker than that in the image processing method corresponding to grade 6.

In addition, each of the plurality of contours included in the edge image in the image processing method corresponding to grade 1 may be adjusted using relatively fewer colors than that in the image processing method corresponding to grade 6.

In addition, a relatively lower number of objects may be identified as meaningful objects in the image processing method corresponding to grade 1 than in the image processing method corresponding to grade 6, and image processing for adjusting at least one of a thickness or a color corresponding to each of the identified objects may be performed.

For example, in the image processing method corresponding to grade 1, one object that satisfies a predetermined condition (e.g., one largest object) may be identified from among the plurality of objects included in the pre-processed image 1', and image processing for adjusting at least one of a thickness or a color corresponding to the identified object may be performed.

Meanwhile, the one or more processors 130 according to an example may receive a user input for setting a visual impairment grade, set the visual impairment grade based on the received user input, and identify an image processing method corresponding to the set visual impairment grade.

The one or more processors 130 may perform some of the various image processing methods for the plurality of contours included in the edge image and not perform the other image processing methods according to the visual impairment grade. For example, the one or more processors 130 may perform a relatively larger number of image processing methods among the various image processing methods for the plurality of contours as the visual impairment grade is lower, and perform a relatively smaller number of image processing methods among the various image processing methods for the plurality of contours as the visual impairment grade is higher.

Figure 12:
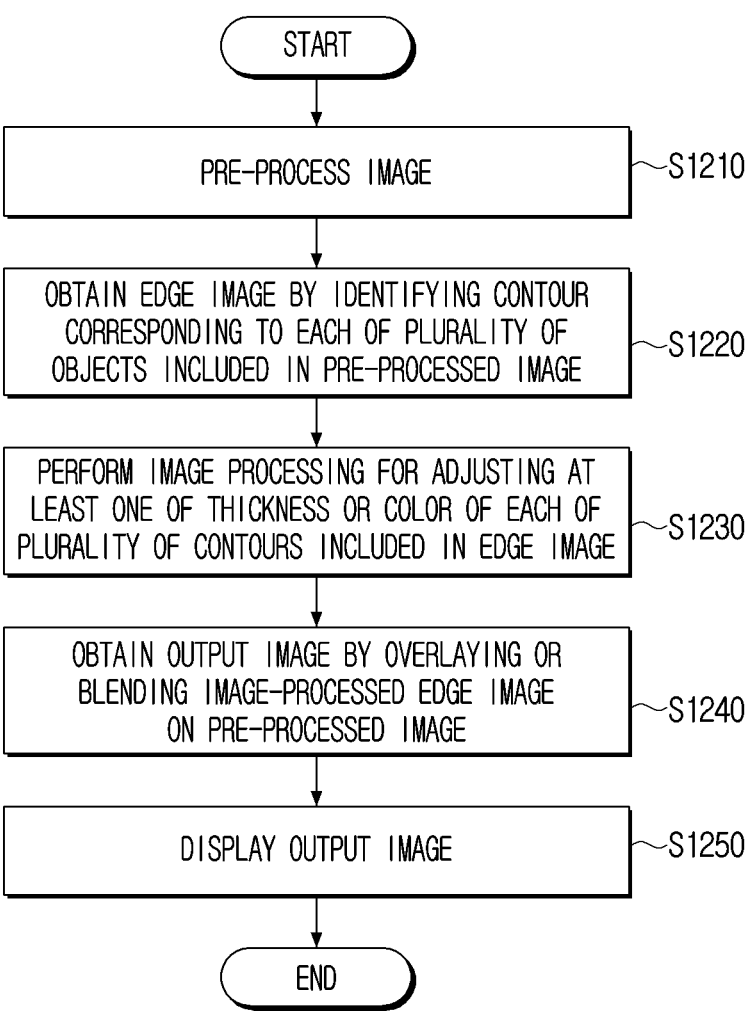
FIG. 12 is a flowchart illustrating an example method of controlling the display apparatus according to various embodiments.

FIG. 12 is a flowchart illustrating an example method of controlling the display apparatus according to various embodiments.

In the method of controlling the display apparatus according to an example, an image is pre-processed (S1210).

An edge image is obtained by identifying a contour corresponding to each of a plurality of objects included in the pre-processed image (S1220).

Image processing for adjusting at least one of a thickness or a color of each of the plurality of contours included in the edge image is performed (S1230).

An output image is obtained by overlaying or blending the edge image subjected to image processing on or with the pre-processed image (S1240).

The output image is displayed (S1250).

Operation S1210 of pre-processing an image may include flattening processing on detail textures included in the image by performing texture filtering on the image, or low light image enhancement processing on the image based on brightness information of the image being smaller than a threshold value.

According to an example, the operation S1230 of performing image processing may include adjusting a contour corresponding to at least one object that satisfies a predetermined condition among the plurality of objects to be relatively thicker than contours corresponding to the other objects, and the predetermined condition may include at least one of a text object, a human object, an object having a critical or larger size, or an object located in an area within a screen.

According to an example, the operation S1230 of performing image processing may include performing image processing for adjusting the plurality of contours included in the edge image to a color corresponding to a user command, or adjusting the plurality of contours to different colors.

Operation S1230 of performing image processing may include identifying an average pixel value of pixels adjacent to one of the plurality of contours; identifying a color that increases contrast sensitivity between the adjacent pixels and the one contour based on the average pixel value; and adjusting the one contour to the identified color.

According to an example, the operation S1230 of performing image processing may include: obtaining a depth map corresponding to the image; increasing a thickness of a contour corresponding to a first object located at a relatively short distance among the plurality of objects based on the depth map; and decreasing a thickness of a contour corresponding to a second object located at a relatively long distance among the plurality of objects based on the depth map.

According to an example, the operation S1210 of pre-processing an image may include performing texture filtering with different intensities on the plurality of objects, respectively, based on the depth map, such that the pre-processed image is obtained, and an intensity of the texture filtering performed on the second object may be higher than an intensity of the texture filtering performed on the first object.

According to an example, the operation S1210 of pre-processing an image may include downscaling the image, the operation S1220 of obtaining an edge image may include obtaining the edge image from the downscaled image, and the operation S1240 of obtaining an output image may include obtaining the output image by overlaying or blending the edge image subjected to image processing on or with the downscaled image and upscaling the output image.

According to an example, the operation S1240 of obtaining an output image may include performing noise filtering on the output image.

The operation S1250 of displaying the output image may include displaying the image in a first area within a screen of the display apparatus and displaying the output image in a second area within the screen.

Figure 13:
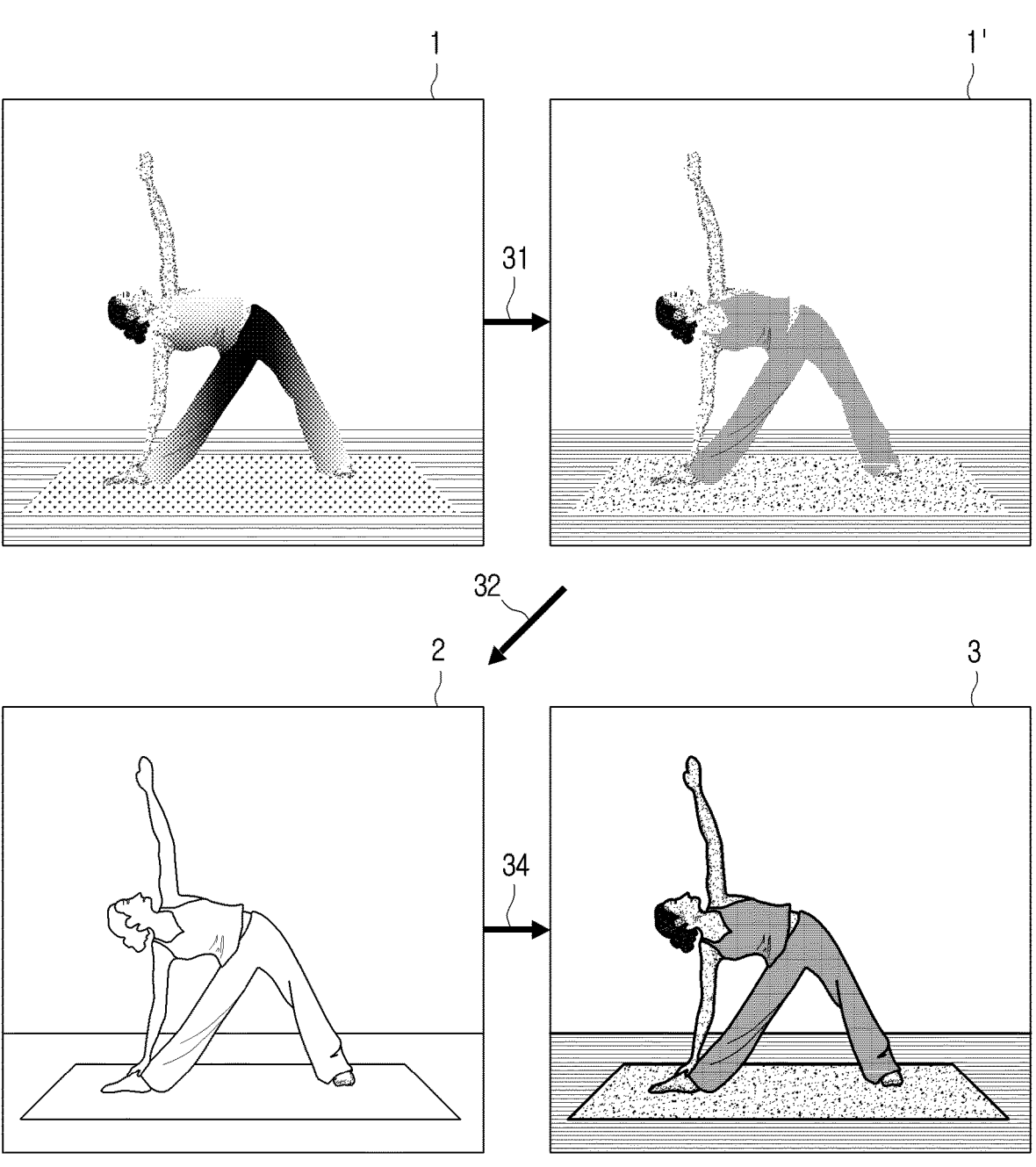
FIG. 13 is a diagram illustrating an example image and an example output image according to various embodiments.

FIG. 13 is a diagram illustrating an example image and an output image according to various embodiments.

Referring to FIG. 13, the one or more processors 130 may pre-process the image 1 (31). For example, the one or more processors 130 may obtain a pre-processed image 1' by performing flattening processing on textures of the image 1, performing de-noising processing on the image 1, or low light image enhancement processing on the image 1. The one or more processors 130 may obtain an edge image 2 by identifying contours in the pre-processed image 1' (32).

The one or more processors 130 may adjust a thickness or a color of a contour corresponding to at least one object identified as a meaningful object from among the plurality of objects in the edge image 2 or at least one region identified as a meaningful region from among the plurality of regions in the edge image 2 (33, 34). For example, the one or more processors 130 may change the contour to a specific color (e.g., green), and perform image processing for adjusting the thickness of the contour (to be thicker) to obtain an edge image subjected to image processing.

The one or more processors 130 may obtain an output image 3 by overlaying or blending the edge image 2 subjected to image processing on the pre-processed image 1'.

The various embodiments of the disclosure may be applied to not only the display apparatus but also any electronic device including a display.

Meanwhile, the above-described various embodiments may be implemented in a recording medium that can be read by a computer or an apparatus similar thereto using software, hardware, or a combination thereof. In some cases, the embodiments described in the disclosure may be implemented by a processor itself. According to implementation by software, the embodiments including the procedures and functions described in the disclosure may be implemented by separate software modules. Each of the software modules may perform one or more of the functions and operations described in the disclosure.

Meanwhile, computer instructions for performing processing operations of the display apparatus 100 according to the above-described various embodiments of the disclosure may be stored in a non-transitory computer-readable medium. When executed by a processor of a specific device, the computer instructions stored in the non-transitory computer-readable medium cause the specific device to perform the processing operations in the display apparatus 100 according to the above-described various embodiments.

The non-transitory computer-readable medium refers to a medium that stores data semi-permanently and is readable by a device. Examples of non-transitory computer-readable mediums may include a CD, a DVD, a hard disc, a blue-ray disc, a USB, a memory card, and a ROM.

Although various example embodiments of the disclosure have been illustrated and described above, the disclosure is not limited to the various example embodiments described above, and various modification may be made by those skilled in the art without departing from the gist of the disclosure including the appended claims. It will also be understood that any of the embodiment(s) described herein may be used in conjunction with any other embodiment(s) described herein.

What is claimed is:

1. A display apparatus comprising:
a display;
memory storing at least one instruction; and
at least one processor, comprising processing circuitry, connected to the display and the memory to control the display apparatus and
configured to:
    pre-process an image;
    obtain an edge image by identifying a contour corresponding to each of a plurality of objects included in the pre-processed image;
    perform image processing to adjust a color of one or more of the contours included in the edge image, wherein the image processing to adjust color comprises identifying an average pixel value of pixels adjacent to one of the contours, identifying a color that increases contrast sensitivity between the adjacent pixels and the one contour based on the average pixel value, and adjusting the one contour to the identified color;
    obtain an output image by overlaying or blending the edge image subjected to image processing on or with the pre-processed image; and
    display the output image through the display.

2. The display apparatus as claimed in claim 1, wherein the pre-processing of the image includes: flattening processing on detail textures included in the image by performing texture filtering on the image, de-noising processing on the image, or low light image enhancement processing on the image based on brightness information of the image being smaller than a threshold value.

3. The display apparatus as claimed in claim 1, wherein at least one processor comprising processing circuitry is configured to: adjust a contour corresponding to at least one object that satisfies a specified condition among the plurality of objects to be relatively thicker than contours corresponding to other objects, and
    the specified condition includes at least one of a text object, a human object, an object having a critical or larger size, or an object located in an area within a screen.

4. The display apparatus as claimed in claim 1, wherein at least one processor comprising processing circuitry is configured to:
    perform image processing to adjust the contours included in the edge image to a color corresponding to a command.

5. The display apparatus as claimed in claim 1, wherein at least one processor comprising processing circuitry is configured to:
    obtain a depth map corresponding to the image;
    increase a thickness of a contour corresponding to a first object located at a relatively short distance among the plurality of objects based on the depth map; and
    decrease a thickness of a contour corresponding to a second object located at a relatively long distance among the plurality of objects based on the depth map.

6. The display apparatus as claimed in claim 5, wherein at least one processor comprising processing circuitry is configured to: perform texture filtering with different intensities on the plurality of objects, respectively, based on the depth map, to obtain the pre-processed image, and
    wherein an intensity of the texture filtering performed on the second object is greater than an intensity of the texture filtering performed on the first object.

7. The display apparatus as claimed in claim 1, wherein at least one processor comprising processing circuitry is configured to:
    downscale the image, and obtain the edge image from the downscaled image;
    obtain the output image by overlaying or blending the edge image subjected to image processing on or with the downscaled image; and
    upscale the output image and provide the upscaled image through the display.

8. The display apparatus as claimed in claim 1, wherein at least one processor comprising processing circuitry is configured to: perform noise filtering on the output image and provide the noise-filtered output image through the display.

9. The display apparatus as claimed in claim 1, wherein at least one processor comprising processing circuitry is configured to control the display to display the image in a first area within a screen of the display, and display the output image in a second area within the screen.

10. The display apparatus as claimed in claim 1, wherein the pre-processing comprises:
    obtain a depth map corresponding to an image comprising a plurality of objects, the plurality of objects including a first object and a second object; and
    perform texture filtering with different intensities on the plurality of objects, respectively, based on the depth map, to obtain a pre-processed image, wherein an intensity of the texture filtering performed on the second object is greater than an intensity of the texture filtering performed on the first object.

11. The display apparatus as claimed in claim 1, wherein the pre-processing comprises:

obtain a depth map corresponding to an image comprising a plurality of objects;

increase a thickness of a contour corresponding to a first object located at a relatively short distance among the plurality of objects based on the depth map and decrease a thickness of a contour corresponding to a second object located at a relatively long distance among the plurality of objects based on the depth map; and perform texture filtering with different intensities on the plurality of objects, respectively, based on the depth map, to obtain a pre-processed image, wherein an intensity of the texture filtering performed on the second object is greater than an intensity of the texture filtering performed on the first object.

12. A method of controlling a display apparatus, the method comprising:

pre-processing an image;

obtaining an edge image by identifying a contour corresponding to each of a plurality of objects included in the pre-processed image;

performing image processing to adjust at least one of a thickness or a color of each of the contours included in the edge image, wherein the image processing to adjust color comprises identifying an average pixel value of pixels adjacent to one of the contours, identifying a color that increases contrast sensitivity between the adjacent pixels and the one contour based on the average pixel value, and adjusting the one contour to the identified color;

obtaining an output image by overlaying or blending the edge image subjected to image processing on or with the pre-processed image; and displaying the output image.

13. The method as claimed in claim 12, wherein the pre-processing of the image includes flattening processing on detail textures included in the image by performing texture filtering on the image, de-noising processing on the image, or low light image enhancement processing on the image based on brightness information of the image being smaller than a threshold value.

14. The method as claimed in claim 12, wherein the performing of the image processing includes adjusting a contour corresponding to at least one object that satisfies a specified condition among the plurality of objects to be relatively thicker than contours corresponding to the other objects, and the specified condition includes at least one of a text object, a human object, an object having a critical or larger size, or an object located in an area within a screen.

15. The method as claimed in claim 12, wherein the performing of the image processing includes performing image processing to adjust the contours included in the edge image to a color corresponding to a user command.

16. The method as claimed in claim 12, wherein the performing of the image processing includes:

obtaining a depth map corresponding to the image;

increasing a thickness of a contour corresponding to a first object located at a relatively short distance among the plurality of objects based on the depth map; and decreasing a thickness of a contour corresponding to a second object located at a relatively long distance among the plurality of objects based on the depth map.

17. The method as claimed in claim 16, wherein the pre-processing of the image includes:

performing texture filtering with different intensities on the plurality of objects, respectively, based on the depth map, to obtain the pre-processed image, and wherein an intensity of the texture filtering performed on the second object is greater than an intensity of the texture filtering performed on the first object.

18. The method as claimed in claim 12, wherein the pre-processing of the image includes downscaling the image, and wherein the obtaining the edge image includes obtaining the edge image from the downscaled image, and wherein the obtaining the output image includes:

obtaining the output image by overlaying or blending the edge image subjected to image processing on or with the downscaled image; and upscaling the output image and provide the upscaled image through a display.

19. The method as claimed in claim 12, wherein the obtaining the output image includes performing noise filtering on the output image and provide the noise-filtered output image through a display.

20. A non-transitory computer readable recording medium storing a program which, when executed by at least one processor of a display apparatus, control the display apparatus to perform operations comprising:

pre-processing an image;

obtaining an edge image by identifying a contour corresponding to each of a plurality of objects included in the pre-processed image;

performing image processing to adjust at least one of a thickness or a color of each of the contours included in the edge image, wherein the image processing to adjust color comprises identifying an average pixel value of pixels adjacent to one of the contours, identifying a color that increases contrast sensitivity between the adjacent pixels and the one contour based on the average pixel value, and adjusting the one contour to the identified color;

obtaining an output image by overlaying or blending the edge image subjected to image processing on or with the pre-processed image; and displaying the output image.

* * * * *